April 28, 1953   D. H. BALLANTYNE ET AL   2,636,553
FUEL SYSTEM FOR GAS TURBINE ENGINES AND THE
LIKE WITH MAIN AND PILOT FUEL INJECTORS
Filed March 6, 1950   6 Sheets-Sheet 1
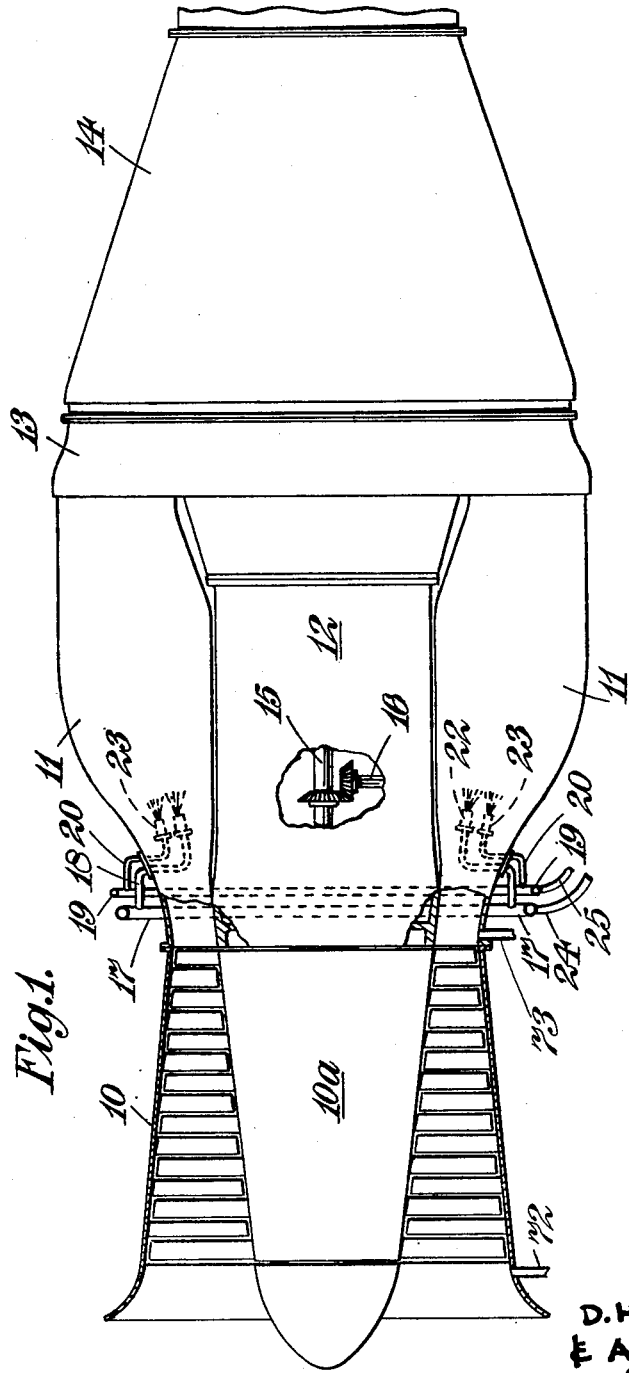
INVENTORS
D. H. BALLANTYNE
& ALBERT JUBB
by Wilkinson
Attys.

April 28, 1953     D. H. BALLANTYNE ET AL     2,636,553
FUEL SYSTEM FOR GAS TURBINE ENGINES AND THE
LIKE WITH MAIN AND PILOT FUEL INJECTORS
Filed March 6, 1950     6 Sheets-Sheet 2
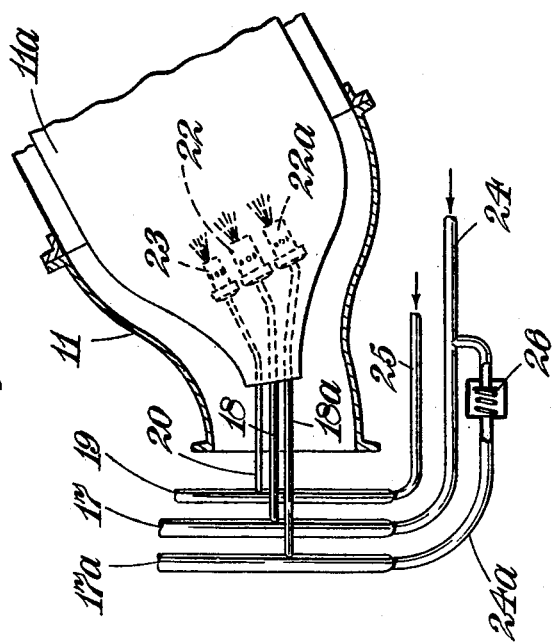
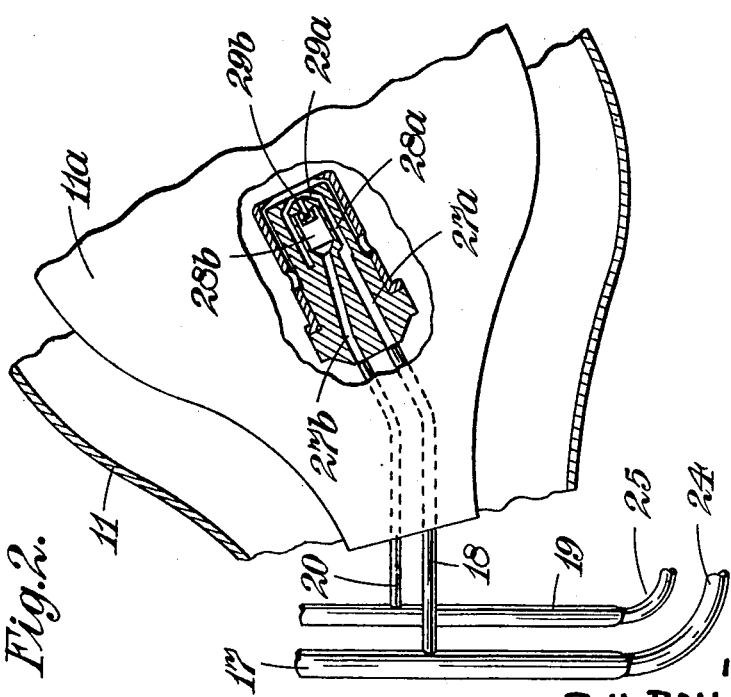
INVENTORS
D. H. BALLANTYNE
& ALBERT JUBB
by Wilkinson Mawhinney
Attys.

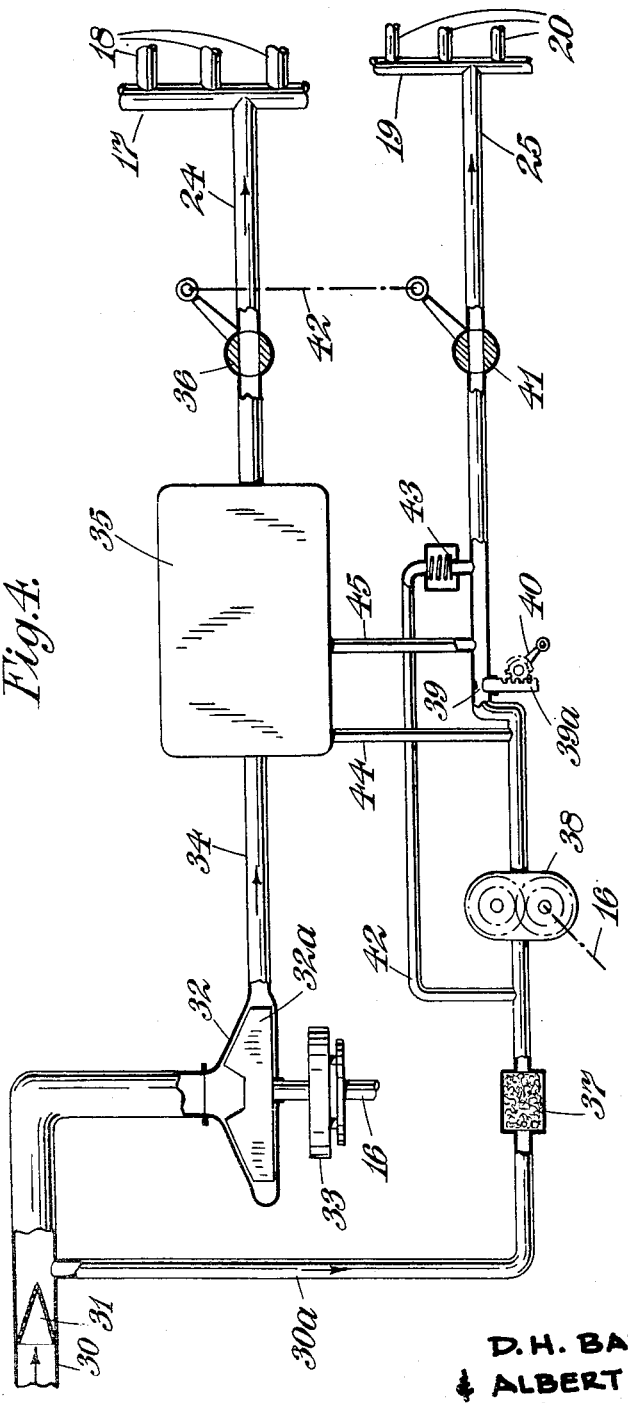

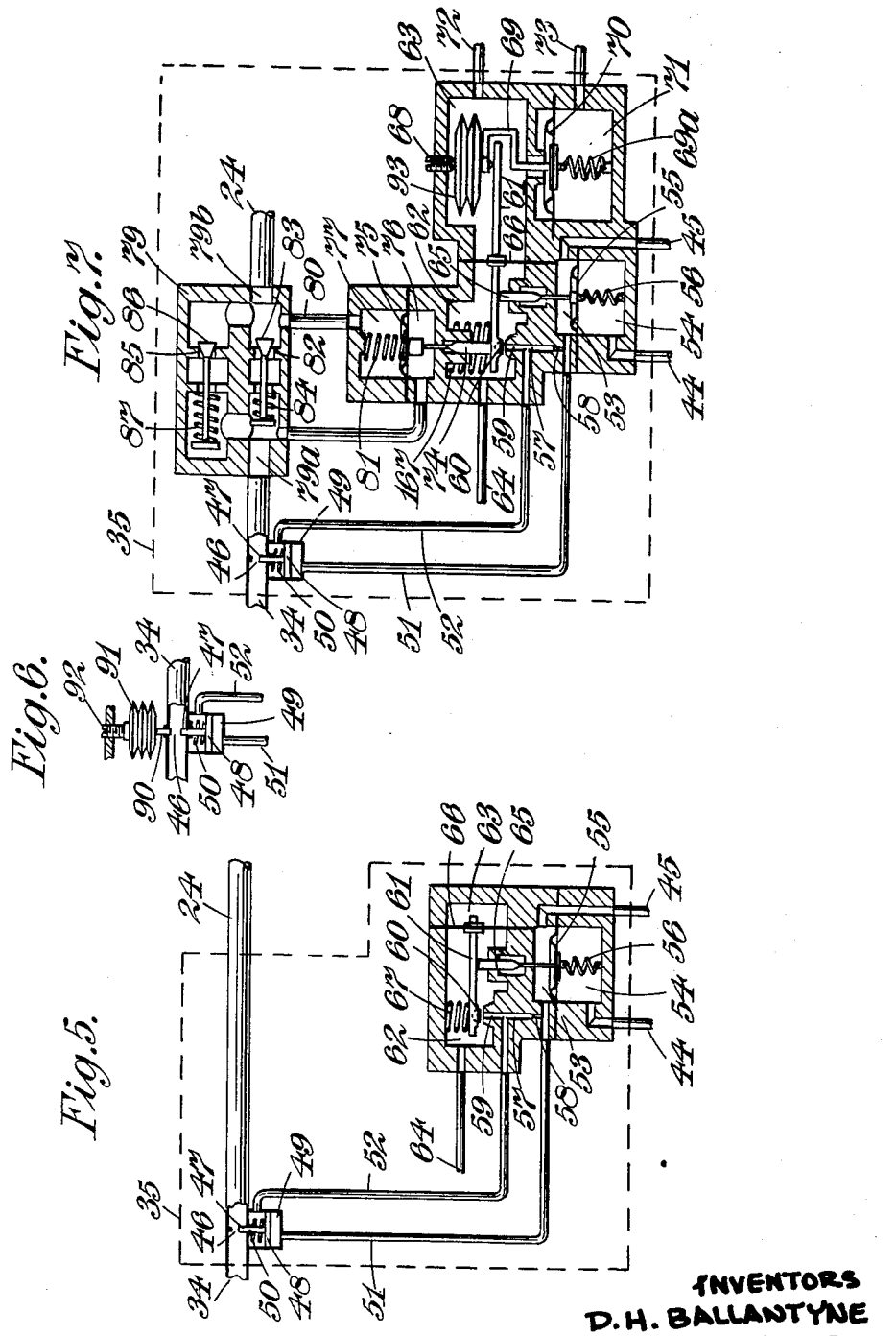

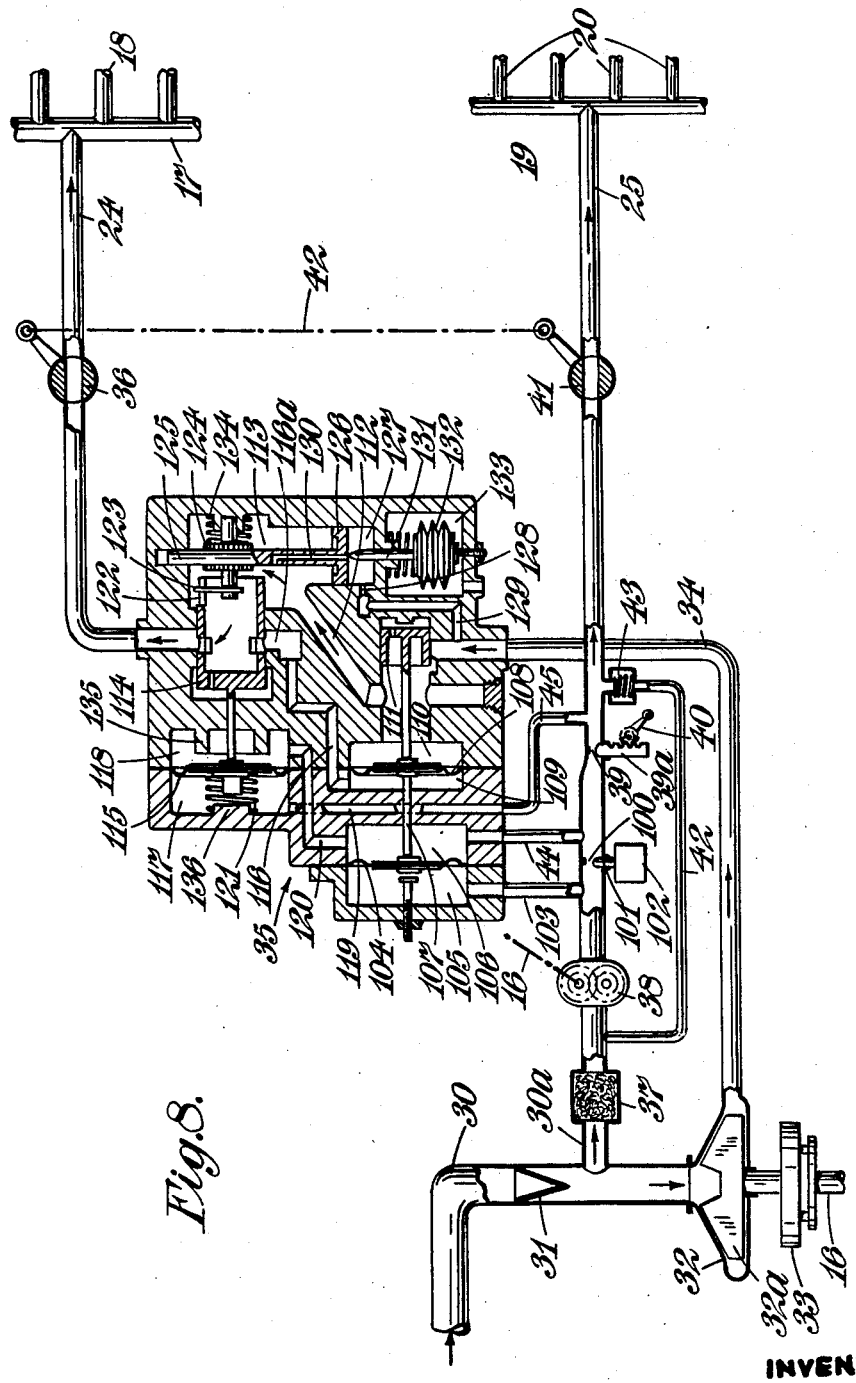

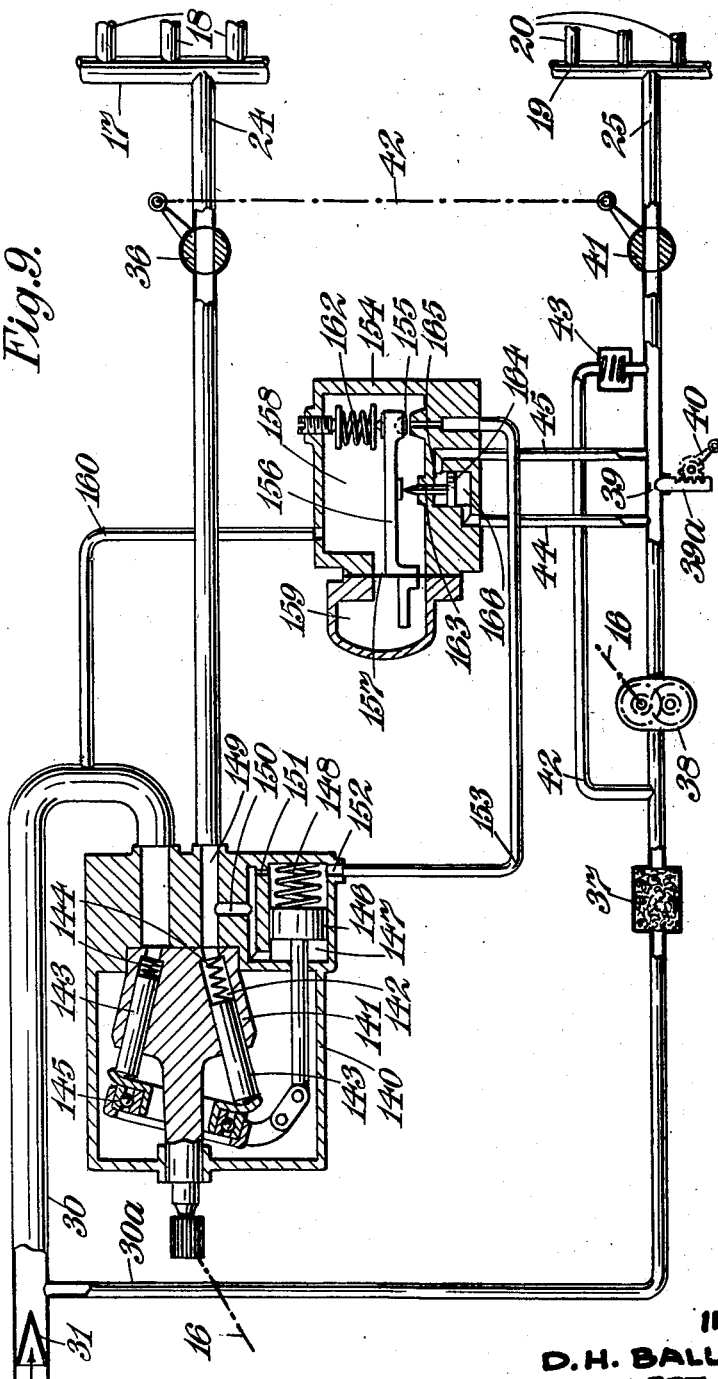

Patented Apr. 28, 1953

2,636,553

UNITED STATES PATENT OFFICE 2,636,553

FUEL SYSTEM FOR GAS TURBINE ENGINES AND THE LIKE WITH MAIN AND PILOT FUEL INJECTORS

David Havelock Ballantyne, Littleover, and Albert Jubb, Buttershaw, Bradford, England, assignors to Rolls-Royce Limited, Derby, England, a British company Application March 6, 1950, Serial No. 147,892
In Great Britain November 8, 1949

12 Claims. (Cl. 158—36.4)

This invention relates to fuel systems for gas-turbine engines or the like.

The invention is concerned with fuel systems of the kind including a liquid-fuel pressurising pump system, burner or injector devices in the combustion system of the engine, and control means for varying in a desired manner the supply of liquid fuel to the burner or injector devices. For convenience, in this specification, the term "injector" will be employed to designate both burner and injector devices.

In certain known fuel systems, an injector arrangement has been provided comprising a pilot injector system and a main injector system. The object of such an arrangement is to improve the combustion characteristics of the fuel system as a whole, it being arranged that, during starting and low-power running of the engine, the fuel delivery is effected solely through the pilot injectors, and that during high-power running of the engine, the fuel delivery is effected, either additionally or alternatively, through the main injectors.

The injectors of the pilot system are so designed as to have efficient atomisation or flow characteristics at low fuel flows, and the injectors of the main system are so designed as to have efficient atomisation or flow characteristics at high fuel flows without necessitating excessively high fuel delivery pressures by the fuel pressurising pump system.

The primary object of the present invention is to provide an improved fuel system of the kind in which both pilot and main injector systems are provided, whereof the pilot injector system is operative during starting and low and high-power running of the engine.

According to the present invention, in a fuel system for gas-turbine engines or the like of the class comprising main fuel injectors, a main pump to deliver fuel to the main fuel injectors, a member movable to control the fuel delivery to the main fuel injectors, and pilot fuel injectors, there is provided the combination with said pilot fuel injectors, of an auxiliary pump of the fixed-capacity positive-displacement type to deliver fuel thereto, said auxiliary pump being driven at a speed proportional to the engine rotational speed, flow restricting means through which passes the full flow from said auxiliary pump, and pressure responsive means subjected to the difference in pressures on each side of said flow restricting means to actuate said member movable to control the delivery from said main pump to said main fuel injectors.

According to a feature of the present invention a fuel system for gas-turbine engines of the kind specified comprises a main fuel pump arranged to deliver fuel to the main fuel injectors, a member movable to control the fuel delivery to the main fuel injectors, pilot fuel injectors, a fixed-capacity positive-displacement pump arranged to be driven at a speed proportional to engine rotational speed and to deliver fuel to the pilot injectors, flow restricting means arranged to pass the full delivery of said fixed-capacity pump, a pressure-sensitive device subjected to the pressure drop across the flow-restricting means and means actuated by said pressure-sensitive device to control the fuel delivery to the main fuel injectors.

Preferably, the flow-restricting means is arranged to have a variable effective area and a control member is provided to select the effective area of the flow-restricting means thereby to select a datum to which the fuel supply to the main fuel injectors is controlled; alternatively, the pressure-sensitive device may incorporate a selectively variable resilient loading for the same purpose. The main fuel pump may be a pump of the variable delivery kind, such as a positive-displacement pump having mechanism for varying its volumetric capacity; examples of such displacement pumps include piston or plunger pumps in which the effective stroke is varied, and eccentric vane pumps in which the eccentricity of a rotor with respect to a casing is varied. In certain preferred embodiments, however, the variable delivery pump used may be of the impeller kind, i. e. of the non-positive displacement kind; for example, a centrifugal impeller pump may be used, in which the delivery may be varied by simple throttling on the inlet or delivery side.

The fixed-capacity positive-displacement pump for the pilot fuel system may, for example, be a gear type pump, an eccentric-vane type pump or a fixed stroke piston or plunger type pump.

It will be appreciated that in systems according to the invention, the provision of a fixed-capacity positive-displacement pump driven at a speed proportional to engine speed and passing its full delivery through a flow-restricting means provides a pressure drop across the flow-restricting means which is a direct function of the engine speed.

According to a feature of the invention, a fuel system for gas-turbine engines of the kind specified may comprise a variable-delivery fuel pump, the outlet from which is connected by way of fuel delivery control means to the main injectors; and, in parallel with said variable delivery pump, a fixed-capacity positive-displacement pump arranged to be driven at a speed proportional to the engine rotational speed, the inlet of which is in communication with the inlet of the variable-delivery pump, and from the outlet of which fixed-capacity pump the fuel is delivered by way of a flow-restricting means, the area of which is selectively variable, to the pilot injectors; and a pressure-sensitive device arranged to be subjected to the pressure drop across said flow-restricting means and connected to actuate the fuel delivery control means thereby to control the flow of fuel to the main burner or injector system.

In systems according to the present invention, the control means which is actuated by the pressure-sensitive device subjected to the pressure drop across the flow-restricting means may control the fuel delivery by a throttle device as described in co-pending United States application Serial No. 87,696 filed April 15, 1949, by K. R. Davies and K. Herbstritt; or alternatively as described in co-pending United States application Serial No. 109,842, filed August 12, 1949, by A. Jubb; both applications having been assigned to Rolls-Royce Limited, the assignee of the present application.

The manner in which the invention may be applied in practice will now be described with reference to the accompanying drawings in which:

Figure 1 is a diagrammatic view of one form of gas-turbine engine in the fuel system of which the invention may be employed;

Figure 2 is a detailed view partly in section and illustrates a modified arrangement of fuel injectors to that illustrated in Figure 1;

Figure 3 is a detailed view and illustrates yet another fuel injector arrangement suitable for use with the gas-turbine engine of Figure 1;

Figure 4 illustrates diagrammatically one fuel system arrangement according to this invention;

Figures 5 illustrates diagrammatically a detailed construction of part of the fuel system arrangement illustrated in Figure 4;

Figure 6 illustrates a modification applicable to the arrangement of Figure 5;

Figure 7 is similar to Figure 5 and illustrates a modification thereof;

Figure 8 illustrates diagrammatically yet another fuel system arrangement according to this invention, and Figure 9 illustrates diagrammatically yet another fuel system according to this invention.

In each of the figures of the drawings the same reference numerals are employed to indicate corresponding parts.

Referring to Figure 1, there is shown a typical gas-turbine engine comprising an air compressor 10, a plurality of combustion chambers 11 arranged to receive compressed air from the compressor and to have fuel burnt in them to heat the air, a turbine 13 receiving the heated gases from the combustion chambers and arranged to drive the compressor rotor 10a through a shaft 15 and an exhaust assembly 14 receiving the exhaust gases from the turbine 13. The number of combustion chambers 11, of which two only are shown, may be varied and the combustion chambers are disposed in a ring around a structural casing 12 which extends within the ring of combustion chambers 11 from the compressor 10 to the turbine 13. The turbine 13 is also arranged to drive various auxiliary equipment such as fuel and oil pumps by providing on the shaft 15 a suitable drive take-off indicated at 16.

The fuel is injected into the combustion chambers by fuel injector devices and the invention is concerned with fuel systems associated with injector arrangements of the kind in which there is a pilot supply employed during starting and slow running of the engine and a main supply which is employed during high power running of the engine. The supply to the pilot injector arrangement is in some gas-turbine engines cut-off during high power running, but the invention is concerned with those injector arrangements in which fuel is always supplied through the pilot system.

Referring again to Figure 1, one such main and pilot injector arrangement is illustrated and comprises a main fuel manifold 17 arranged to be supplied with fuel through a supply pipe 24 and having a series of branch pipes 18 leading to main injectors 22, and a pilot fuel manifold 19 arranged to be supplied with fuel through a supply pipe 25 and having a series of branch pipes 20 leading to pilot injectors 23. It will be seen that in this arrangement two injectors, a pilot injector 23 and a main injector 22, are provided for each combustion chamber 11.

In another arrangement illustrated in Figure 2 a single injector device is provided and this injector device comprises two injection nozzles, one of which is employed for the pilot fuel and the other of which is employed for the main fuel. The main fuel flows from the appropriate branch pipe 18 into a supply passage 27a in the fuel injector 27 and thence from the supply passage 27a into an annular chamber 28a having an outlet in the form of a main fuel nozzle 29a. The pilot fuel flows from the branch pipe 20 into a passage 27b in the fuel injector 27 and thence into a central chamber 28b having an outlet 29b forming the injection nozzle for the pilot fuel. The fuel injector 27 may be so constructed as to impart a swirl to the fuel leaving the chambers 28a, 28b prior to its passage through the nozzles 29a and 29b.

Instead of providing a single injector having two nozzles, as illustrated in Figure 2, or providing two fuel injectors one for the pilot fuel and one for the main fuel, as illustrated in Figure 1, three fuel injectors may be provided for each combustion chamber 11 and one such arrangement is illustrated in Figure 3. In this arrangement, as in the arrangement of Figure 1, there is a pilot injector 23 supplied with fuel from the pilot manifold 19 and two main fuel injectors 22, 22a, of which the injector 22 is supplied with fuel from the main fuel manifold 17 as in the arrangement of Figure 1, and whereof the main fuel injector 22a is supplied from a manifold 17a through a branch pipe 18a, the manifold 17a being supplied with fuel through a supply pipe 24a connected with the supply pipe 24 and having arranged therein a pressurising valve 26. In such an arrangement the fuel is supplied to the combustion chamber 11 during starting and low power running through the pilot injector 23. As the power output of the engine increases fuel is first supplied through the main injector 22 and when the fuel delivery pressure in the supply pipe 24 reaches a given value the valve 26 opens and fuel is then also supplied to the combustion chamber through the other main injector 22a.

In the arrangements illustrated in Figures 2 and 3, the combustion chambers 11 are illustrated as being provided with a flame tube or liner 11a which affords protection for the outer casing of the combustion chamber.

Referring now to Figure 4, there is illustrated diagrammatically a fuel system arrangement according to this invention suitable for use with the injector arrangements just described.

The fuel system comprises a fuel suction pipe 30 which is connected with a fuel tank (not shown) and delivers to the fuel system for the main injectors and is provided with a branch pipe 30a leading to the fuel system for the pilot injectors. A coarse filter is provided in the suction pipe 30 upstream of the branch pipe 30a.

The fuel system for the main fuel injectors comprises a fuel pump 32, illustrated as a non-positive displacement pump of the centrifugal type, whereof the impeller 32a is driven through a suitable coupling 33 from the drive take-off 16. The pump 32 delivers into a pipeline 34 to a control mechanism 35 for controlling the fuel delivery to the main injectors, the outlet from the control mechanism 35 being connected with the supply pipe 24 leading to the main fuel manifold 17 and branches 18. A shut-off cock 36 is provided in the main fuel supply pipe 24, the shut-off cock being fully open during operation of the engine and being fully closed when the engine is not running.

It will be noticed that fuel entering the fuel system for the main injectors is only passed through a coarse filter. The main fuel system is designed so that it is not susceptible to damage by small particles of dirt which may pass through a coarse filter.

The fuel system for the pilot injectors comprises a fine filter 37 in the branch pipe 30a, and a fixed-capacity positive-displacement pump 38, illustrated as a gear type pump, having its suction side connected with the branch pipe 30a and delivering into the pilot manifold supply pipe 25. The pump 38 is driven from the engine through the drive take-off 16. Located in the supply pipe 25, there is a variable-area flow-restricting orifice 39, whereof the effective area is arranged to be adjusted by a valve member 39a, the position of which can be adjusted to select the effective area of the orifice by a control member 40. Also in the supply pipe 25 there is a shut-off cock 41 which is similar to the shut-off cock 36 and which is preferably ganged with the shut-off cock 36 through a coupling 42 for simultaneous operation.

A by-pass pipe 42 extends from the supply pipe 25 from just upstream of the shut-off cock 41 back to the suction side of the fixed-capacity positive-displacement pump 38, and the flow through the by-pass pipe 42 is controlled by a relief valve 43 so that the pressure in the supply pipe 25 is maintained constant on the downstream side of the variable-area orifice 39.

Two branch pipes are taken from the supply pipe 25, the branch pipe 44 joining the supply pipe 25 between the pump 38 and the variable area orifice 39 and the pipe 45 joining the supply pipe 25 between the variable area orifice 39 and the point of connection to the supply pipe 25 of the by-pass pipe 42.

Since the fixed-capacity positive-displacement pump 38 is driven from the engine its speed will be proportional to the engine rotational speed and therefore its delivery will be substantially proportional to the engine rotational speed. The full delivery from the pump 38 passes through the variable area orifice 39 so that a pressure difference is created across the orifice which is substantially proportional to the square of the engine rotational speed. The opposite ends of the branch pipes 44, 45 are connected with the control mechanism 35 of the main injector fuel supply system thereby applying in the control mechanism the pressure difference created by the variable area orifice 39 to effect a control operation in the control mechanism 35.

It will thus be seen that with a fuel system according to this invention, the fuel flow to the main injectors is controlled by the flow from the pump 38 delivering fuel to the pilot fuel injectors.

The control mechanism 35 may be so arranged as to control the flow of fuel to the main injectors as to maintain a selected engine rotational speed and the speed at which the engine is governed is selected by adjustment of the effective area of the orifice 39 through the control member 40. The control mechanism 35 may also be arranged to effect other controls on the fuel delivery to the main injectors, for instance the control mechanism 35 may also be arranged to prevent excessive quantities of fuel passing to the main fuel injectors during acceleration of the engine.

One suitable form of control mechanism 35 is illustrated in Figure 5, and is arranged to control the flow of fuel to the main injectors so as to maintain the engine rotational speed selected by adjustment of the effective area of orifice 39.

The control mechanism comprises in the delivery pipe 34 of the main fuel pump 32 an orifice 46, the area of which can be varied by means of a valve element such as a weir plate 47 which is adjustable by means of a piston 48 operating in a cylinder 49 under control of a spring 50 and fluid pressures applied to the piston 48 through conduits 51, and 52.

The conduit 51 opens at one end to the cylinder 49 on the side of the piston 48 remote from the spring 50, and at its other end into a chamber 53 formed in the body of the control mechanism, which chamber 53 is also connected with the branch pipe 45 leading from the downstream side of the variable-area orifice 39. The chamber 53 is separated from a further chamber 54 by a flexible diaphragm 55 loaded by tension spring 56, the chamber 54 being connected through the branch pipe 44 to the upstream side of the variable-area orifice 39 in the supply pipe 25 to the pilot injectors.

The conduits 51 and 52 are interconnected through a duct 57 in which is located a fixed-restrictor 58, and the conduit 52 is connected with a bleed passage 59, the outflow from which is controlled by a half ball valve element 60. The half ball valve 60 is carried on one end of a lever 61, the lever 61 being supported by a diaphragm 66 separating a chamber 62, into which the bleed flow from the bleed passage 59 passes, from a chamber 63 into which the opposite end of the lever 61 projects. A return pipe-line 64 leads back from the chamber 62 to the suction side of the fuel pumps 32, 38.

The diaphragm 55 has connected to it a push rod element 65 which bears on the lever 61 between the end carrying the half ball valve element 60 and its point of connection to the diaphragm 66. It will thus be seen that since the diaphragm 55 is loaded by the pressure difference across the variable-area orifice 39, the push rod 65 will apply to the lever 61 a load tending to open the half ball valve 60, which load is proportional to the pressure difference across the orifice 39 and which is thus proportional to the square of the engine rotational speed.

The lever 61 is also loaded, in the sense of closure of the half ball valve element 60, by a spring 67, to maintain the lever in contact with the push rod 65.

In operation, should the end speed for any reason increase above the value selected by the setting of the effective area of the orifice 39 through the control member 40, the pressure difference across the variable-area orifice will increase by an amount dependent on the increase of speed, and the load applied by the push rod 65 to the lever 61 will increase correspondingly, moving the half ball valve 60 in the sense of opening. Fluid flows through the bleed passage 59 causing a fall in the pressure acting on the spring-loaded side of the piston 48, so that the weir plate 47 will be moved to decrease the effective area of the orifice 46 reducing the flow to the main fuel injectors and thus reducing the engine speed.

Should the engine speed decrease below the selected value, the pressure difference across the diaphragm 55 will decrease. The load exerted by the push rod 65 on the lever 61 will therefore be decreased, under the influence of the tension spring 56, and the lever 61 will be moved in the sense of closing the half ball valve 60 by the action of the spring 67. The pressure on the spring-loaded side of the piston 48 will thus increase, so that the spring 50 moves the piston to adjust the weir plate 47 to increase the effective area of the orifice 46 in a manner to increase the fuel flow to the main fuel injectors and restore the engine speed to the selected value.

In gas-turbine engines the fuel consumption to maintain a selected engine rotational speed decreases as the ambient atmospheric pressure decreases or, in other words, as the altitude of, say, an aircraft fitted with a gas-turbine engine, increases. Thus in an arrangement as illustrated in Figure 5, the spring 50 will be more compressed at high altitudes than at low altitudes, and consequently a greater change in the servo pressure will be required at high altitude to move the weir-plate 47 to compensate for a given change in rotational speed, than will be required at low altitude when the spring 50 is less compressed. It is desirable therefore to provide means to compensate for this effect so that the operating force required to move weir-plate 47, will be substantially constant for any given rotational speed at all altitudes.

Referring to Figure 6, there is illustrated one suitable means for controlling the position of the weir-plate 47 to be substantially constant for any given speed at all altitudes, the arrangement being suitable for use in a control mechanism 35 such as is illustrated in Figure 5.

In this arrangement the effective area of the variable orifice 46 in the delivery pipe 34 from the main fuel pump 32 is controlled not only by the weir plate 47 above referred to, but also by a second weir plate element 90, which is controlled as to the extent to which it projects into the fuel delivery pipe 34 by a barometric capsule 91, which conveniently has an adjustable abutment 92. The capsule 91 will conveniently be evacuated and it will be seen that as the ambient atmospheric pressure decreases, for example due to an increase in altitude, the capsule 91 will expand thus increasing the extent to which the weir plate element 90 projects into the fuel supply pipe 34 and decreasing the effective area of the orifice 46, and thus decreasing the fuel flow to the main fuel injectors. By suitable selection of the rate of the capsule 91, the variation in the effective area of the orifice 46 caused by expansion and contraction of the capsule 91, can be controlled to cause the variation in the fuel delivery to the main fuel injectors required to maintain the speed selected by control member 40 on change of altitude.

A second suitable form of control mechanism is illustrated in Figure 7, which is similar to the control mechanism illustrated in Figure 5 but which is also arranged so that during acceleration the actual fuel flow to the main injectors through the supply pipe 24 can be controlled in dependence on the absolute compressor delivery pressure or in dependence on a function of the compressor delivery pressure and a second pressure, for instance that at the air intake to the engine.

The end of the lever 61 projecting into the chamber 63 is loaded by an evacuated capsule 93 of which one end is fixed to the adjusting screw 68 and the other end is connected to a pull rod 69 carried by a diaphragm 70 which separates chamber 63 from a further chamber 71. The chamber 63 is connected by means of a conduit 72 with any convenient pressure, which may in certain cases advantageously be that at the intake of the engine compressor, and the chamber 71 is connected by means of a conduit 73 with the delivery of the engine compressor (see also Figure 1). The pull rod 69 is loaded by a tension spring 69a which loads the rocking lever 61 in the sense of opening the half ball valve 60. The arrangement is such that when the compressor delivery pressure has increased to a preselected value, the diaphragm 70 has moved against the action of the spring 69a sufficiently to lift the pull rod 69 off the rocking lever 61 to leave it free.

The effective areas of the diaphragm and capsule may be equal so that the loads produced on the rocker lever vary directly with absolute engine compressor delivery pressure. If however the effective areas of the capsule 93 and the diaphragm 70 are unequal, then the load applied by the diaphragm 70 to the lever 61 through the pull rod 69 is a function of the pressures in the chambers 63 and 71.

The lever 61 is also arranged to be loaded by a push rod 74 in the direction of closure by a load which is dependent upon the actual fuel flow to the main fuel injectors. For this purpose the push rod 74 is carried on a diaphragm 75 separating a pair of chambers 76, 77, whereof the chamber 76 is connected by conduit 78 to the upstream side of a valve mechanism 79 connecting the fuel delivery pipe 34 from the main fuel pump 32 with the main fuel delivery pipe 24, and whereof the chamber 77 is connected by a conduit 80 to the downstream side of the valve mechanism 79. A spring 81 is accommodated within the chamber 77 to load the diaphragm 75 in a manner tending to maintain the push rod 74 in contact with the lever 61. The lever 61 is also loaded in the sense of closure of the half ball valve by a light spring 167, the purpose of which will be described below.

The valve mechanism 79 comprises a pair of passages hydraulically in parallel between the inlet 79a and the outlet 79b of the valve mechanism 79, the flow through each of which passages is controlled by valve elements. The first passage comprises a port 82, flow through which is controlled by the conical head 83 of a valve element which is spring-loaded in a direction tending to close off the port 82, and the shape of the head 83 and the rating of the spring 84 are so selected that the pressure drop created between the inlet 79a and the outlet 79b of the valve mechanism 79 is substantially linear with the fuel flow therethrough. The second passage comprises a port 85, flow through which is controlled by a conical valve element 86 which is loaded in the direction of closure by a spring 87; the loading afforded by the spring 87 is selected so that the valve element 86 does not move to open port 85 until a preselected pressure difference occurs between the inlet 79a and the outlet 79b of the valve mechanism 79, and the shape of the valve 86 and the rating of the spring 87 are so selected that after opening of the valve 86 the pressure difference between the inlet 79a and the outlet 79b of the valve mechanism 79 remains substantially constant irrespective of the rate of flow of fuel through the valve mechanism.

It will thus be seen that before opening of the valve 86 the diaphragm 75 is loaded against the spring 81 by a load which is dependent upon the rate of actual fuel flow to the main fuel injectors. The push rod 74 therefore applies a closure load to the lever 61 which becomes progressively less as the rate of fuel flow to the main injectors increases, until the diaphragm 75 lifts off the push rod 74 against the load of the spring 81, after which no load is applied by the push rod 74 to the lever 61. At a fuel flow greater than that corresponding to zero load applied by push rod 74 to the lever 61, the valve 86 opens permitting an increased fuel flow through the valve mechanism 79 with substantially no increase of pressure difference. The light spring 167 is provided to maintain the lever 61 in contact with the push rod 65 after the diaphragm 75 has lifted off the push rod 74.

The operation of the mechanism is as follows:

The weir plate 47 in the delivery pipe 34 from the main fuel pump 32 by its movements under the control of piston 48 varies the flow of fuel from the centrifugal pump 32 to the supply line 24 and thus to the main fuel injectors.

The position of the piston 48 in the cylinder 49 is dependent upon the difference in pressures in the conduits 51 and 52, and the difference in these pressures is dependent upon the rate of bleed of fuel through the bleed passage 59 past the half ball valve 60. If the half ball valve 60 is fully closed then no flow occurs through the passage 59 and the pressures in the conduits 51, 52 are the same. If, however, a bleed occurs through the bleed passage 59 a difference in the pressures in the conduits 51, 52 occurs, due to the presence of the flow restrictor 58 in the duct 57 interconnecting the conduits 51 and 52.

Under steady running conditions of the engine, the bleed through the bleed passage 59 is controlled solely by the load applied to the lever 61 through the push rod 65, the loads applied to the lever 61 by the push rod 74 and pull rod 69 being constant under steady running conditions. The load applied to the lever 61 through the push rod 65 is dependent, as stated above, upon the actual fuel flow through the variable area orifice 39, and it will be seen that, if for any reason the engine speed increases, the flow through and thus the pressure drop across the variable area orifice 39 will also increase, thus increasing the load on the diaphragm 55 tending to rock the lever 61 in a direction to open the half ball valve 60. On the other hand, if for any reason the engine speed falls the flow through the variable area orifice 39 decreases and the difference in pressures on each side of the variable orifice 39 will fall, thus decreasing the load on the lever 61 and reducing the tendency for the push rod 65 to open the half ball valve.

When owing to an unwanted increase in the engine rotational speed the load applied to the lever 61 increases and the half ball valve 60 opens, fluid flows through the bleed passage 59 causing a fall in the pressure acting on the spring-loaded side of piston 48, so that the weir plate 47 will be moved to decrease the effective area of the orifice 46 reducing the flow to the main fuel injectors and thus reducing the engine speed. When an unwanted decrease in speed occurs the half ball valve 60 is more firmly closed due to the load applied to the lever 61 by push rod 65 being decreased and the pressure acting on the spring-loaded side of the piston 48 will increase to be substantially equal to the pressure acting on the opposite side of the piston, so that the spring 50 moves the piston to adjust the weir plate 47 to increase the effective area of the orifice 46 in a manner to increase the fuel flow and restore the engine speed to the value selected by the position of the control member 40. Thus under steady running conditions the engine rotational speed will be maintained at a value determined by the area of the variable area orifice 39 as selected by adjustment of the control member 40, and the fixed-capacity positive-displacement pump 38 which is driven at a speed proportional to the engine speed, the orifice 39 and the pressure-sensitive diaphragm 55 will act as a governor to maintain the engine rotational speed at the selected value.

On adjusting the control member 40 to increase the effective area of the variable area orifice 39 and thus to accelerate the engine, the difference in pressures in the supply pipe 25 on each side of the orifice 39 decreases thus reducing the opening load applied by push rod 65 to the lever 61. Bleed of fluid through the bleed passage 59 is thus cut off and the weir plate 47 is moved to increase the effective area of the orifice 46 permitting an increased fuel flow to the main fuel injectors.

If the control member 40 is adjusted to effect a considerable increase in the effective area of the variable area orifice 39, the consequent reduction of pressure drop between the conduits 44 and 45 on each side of the variable area orifice causes the diaphragm 55 to be moved by the spring 56 away from the push rod 65, leaving the rocking lever 61 controlled by the forces from push rod 74 and pull rod 69 only. It is arranged that by suitable selection of spring loads, diaphragm areas and other characteristics of the control, that when the lever is controlled solely by push rod 74 and pull rod 69, half ball valve 60 will be closed, causing the weir plate 47 to open the restriction 46 in the main fuel line and thus an increase of fuel flow to the main injectors through the supply pipe 24. This increase in flow causes an increase of pressure drop across the valve mechanism 79 which is applied by conduits 78 and 80 to diaphragm 75, which therefore reduces the load exerted by push rod 74 on the rocking lever 61, thus tending to open the half ball valve 60. It will be seen that for any given engine compressor delivery pressure, the fuel flow supplied to the main burners will be limited by the control mechanism described, and that as the compressor delivery pressure increases while the engine accelerates, so fuel flow to the engine is increased proportionately, up to the condition at which the diaphragm 75 lifts off the push rod 74, when the weir plate 47 opens fully. This condition continues till the engine speed has increased sufficiently to force diaphragm 55 on to push rod 65 to move the rocking lever 61 to open the half ball valve 60 and thereby to reduce the fuel flow.

As stated above when a predetermined pressure difference occurs between the inlet 79a and the outlet 79b of the valve mechanism 79, the valve 86 opens and the pressure difference thereafter remains substantially constant. It is arranged that under these conditions the fuel delivery through the supply pipe 24 to the main fuel injectors is, during acceleration, the maximum available from the main pump 32.

Referring now to Figure 8, there is illustrated another fuel arrangement according to this invention which is similar to the arrangement shown in Figure 4, in that it comprises main and pilot fuel systems supplied with fuel from a common suction pipe, in that the main fuel system comprises a non-positive displacement type pump of the centrifugal type delivering through pipeline 34 and a control mechanism 35 to the main supply pipe 24 and in that the pilot fuel system comprises the branch pipe 30a, filter 37, fixed-capacity positive-displacement pump 38 and variable area orifice 39 in the pilot fuel supply pipe 25. The arrangement is similar to that illustrated in Figure 4 also in that the pressure difference across the variable area orifice 39 is employed to effect a control on the fuel supply from the main fuel pump 32 to the main fuel supply pipe 24.

The fuel system arrangement shown in Figure 8 differs from that described with reference to Figure 4, in that there are two flow-restricting orifices in the pilot fuel supply pipe 25, whereof one flow-restricting orifice is the variable area orifice 39 and whereof the other (100) is either a fixed orifice or an orifice the effective area of which is varied by means of an element 101, the position of which is adjusted by an air temperature responsive device 102. It will be appreciated that the difference in pressures in the pilot fuel supply pipe 25 just upstream and just downstream of the orifice 100 is proportional to the square of the engine rotational speed, since as in the previous arrangements the positive-displacement fixed capacity pump 38 is driven at a speed proportional to engine speed. The pressure difference in the pilot fuel supply pipe 25, due to the presence of the orifice 100, is applied in the control mechanism 35 to effect a control on the fuel supply to the main fuel injectors.

A branch pipe 103 is taken from the pilot fuel supply pipe 25 to the control mechanism 35 and the pressure difference across the orifice 100 is applied in the control mechanism 35 through branch pipes 44 and 103.

The control mechanism 35 comprises a flexible diaphragm 104 separating a pair of chambers 105, 106 into which the branch pipes 103 and 44 open respectively, so that the diaphragm 104 is subjected to the pressure difference due to the presence of the orifice 100 in the pilot fuel supply pipe 25. The diaphragm is connected to a rod 107 which has also attached to it a further flexible diaphragm 108 separating a pair of chambers 109, 110 and carrying a piston valve element 111 controlling the flow of fuel from the main fuel pump 32 through the delivery pipe 34 into the chamber 110.

The fuel entering the chamber 110 flows through a duct 112 into a further chamber 113, the outflow from which into the main fuel supply pipe 24 is controlled by a second piston type valve 114 which piston type valve is arranged to be moved axially by a diaphragm 115 and to be rotated by a mechanism responsive to atmospheric pressure.

The chamber 109 is connected by a duct 116 with a chamber 116a connected with the outlet from the valve 114 so that the diaphragm 108 is subjected to the difference in pressures between chamber 113 and the main fuel supply pipe 24, due to the throttling effect of the piston valve 114.

The diaphragm 115 separates a pair of chambers 117, 118 whereof the chamber 117 is connected by a duct 119 to the branch pipe 45 from the pilot fuel supply pipe 25 and the chamber 118 is connected by a duct 120 with the chamber 106 and thus with the branch pipe 44, so that the diaphragm 115 is loaded in accordance with the difference in pressures in the pilot fuel supply pipe 25 due to the variable area orifice 39, the load being applied to the diaphragm 115 in a direction tending to increase the throttling effect of the piston valve 114 and operating against the action of a spring 121.

As stated above, the piston valve 114 is not only slidable axially itself to adjust the effective area of the outlets from the chamber 113 to the main fuel supply pipe 24, but it is also rotatable to adjust in any given axial position of the valve 114 the effective area of the outlets in proportion to the ambient atmospheric pressure. For this purpose the skirt of the piston valve 114 is formed with a slot 122 in which engages a radius arm 123 carried on the spindle of a pinion 124 meshing with a rack formed on the spindle 125 of a servo piston 126. One side of the piston 126 forms part of the wall of the chamber 113 and so is subjected to the pressure of fuel intermediate the two piston valves 111 and 114, and the other side of the piston 126 forms the wall of a chamber 127 communicating through a restricted orifice 128 and a duct 129 with the delivery pipe 34 of the main fuel pump 32.

A bore 130 is formed through the piston 126 and its stem 125 to provide a connection between the chamber 127 and the chamber 113, and the restricting orifice 128 has such a size that a flow of fluid tends to take place through the bore 130 from the chamber 127 into the chamber 113.

The flow through the bore 130 is controlled by a needle valve 131 carried by an evacuated capsule 132 accommodated in a chamber 133 which is open to atmosphere so that the capsule 132 expands and contracts with increase and decrease of altitude. A torsion spring 134 is connected with the pinion 124 to tend to displace the piston 126 in a direction to prevent a flow through the bore 130. The piston under steady conditions thus takes up a position in which the difference in the fluid loads thereon is balanced by the load applied to it through the torsion spring 134. On increase of the altitude and thus on decrease in the atmospheric pressure, the capsule 132 expands tending further to restrict flow through the bore 130 and the pressure in the chamber 127 thus increases displacing the piston (upwardly as viewed in the drawings) against the action of the torsion spring until once again the loads on the piston are balanced. On displacement of the piston 126 the pinion 124 is rotated and the piston valve 114 is also rotated. The arrangement is such that on increase of the ambient atmospheric pressure acting on the capsule 132, the piston valve 114 is rotated to increase the fuel flow from the intermediate chamber 113 past the valve 114 into the main fuel delivery pipe 24 and it is preferably arranged that the change in the engine air flow due to variation in the ambient atmospheric pressure, is accompanied by variations in the fuel flow due to rotation of the valve 114 such as to maintain the engine rotational speed constant for a constant axial position of the valve 114.

The operation of the control above described is as follows.

Assuming the control lever 40 to be adjusted to select an increase in the effective area of the orifice 39 to increase the desired engine rotational speed, then the pressure drop across the orifice 39 which is applied to the diaphragm 115 decreases. The piston valve 114 is thus moved in the opening direction reducing the pressure drop applied to the diaphragm 108, thus moving the valve 111 further open, and permitting an increase in the fuel supply to the main fuel supply pipe 24. Contrariwise, on adjustment of the lever 40 to decrease the effective area of the orifice 39, the load applied to the diaphragm 115 is increased moving valve 114 in the sense of closing, causing an increase of pressure drop to be applied to diaphragm 108 so that the valve 111 is moved in a direction of closure to reduce the fuel supply to the main fuel supply pipe 24.

The valve 111 controlled by the first hydraulic governor, formed by pump 38, orifice 100, and diaphragms 104 and 108, operates to define for each instantaneous rotational speed of the engine, and altitude, a pre-selected pressure drop across the valve 114, the pressure drop across the orifice 100, which is proportional to the square of the engine rotational speed, being applied across the diaphragm 104 and the pressure drop across the valve 114, which is proportional to the square of the fuel flow, being applied across the diaphragm 108, the opposed loads on the two diaphragms controlling the valve 111 by means of the rod 117 to adjust the pressure in the chamber 113 so that the pressure drop across the valve 114, and therefore the fuel flow, is dependent on the rotational speed of the engine. It will be appreciated that when the valve 114 is fully open, the pressure in the chamber 113 which is determined by the first hydraulic governor will define the maximum fuel flow to the engine. The effective area of the valve 114 is controlled in the axial sense by the second hydraulic governor, comprising pump 38, variable area orifice 39, and diaphragm 115, to maintain the fuel flow through the valve 114 at a value corresponding to the engine speed selected by the setting of the variable-area orifice 39. Should the actual rotational speed fall below the speed selected by the setting of the variable-area orifice 39, the pressure drop across the orifice falls, causing the diaphragm 115 to move to the right as shown in Figure 8 to open the valve 114 to increase the fuel flow and thus restore the selected speed.

The opening and closing of the valve 114 is limited by stops 135 and 136 and thus, since the pressure drop across the valve is controlled by the valve 111 as above described, the maximum and minimum fuel flows to the engine are limited proportionally to the engine rotational speed.

The effective area of the valve 114 is also controlled to move, in the sense of rotation, proportionally to ambient atmospheric pressure as above described.

If the area of the orifice 100 is varied in accordance with the ambient air temperature, then the position of the valve 111 is modified to take into account variations in engine fuel consumption at varying air temperatures.

In the fuel supply arrangements as above described, the control of the main fuel supply is effected by adjusting a movable member controlling the flow from the main fuel pump 32 to the main fuel injection devices. Moreover, in the arrangements above described the main fuel pump is a non-positive displacement pump.

There will now be described with reference to Figure 9 a fuel supply arrangement according to this invention in which the main fuel pump is a positive type displacement pump and in which the variation of the fuel supply to the main fuel injectors is varied by varying the delivery of the pump.

The fuel arrangement comprises as before a main suction pipe 30 leading to the main injector fuel system and a branch pipe 30a leading to the pilot injector fuel system.

The pilot fuel injector system is the same as that described with reference to Figure 4 comprising a fine filter 37, a fixed-capacity positive-displacement pump 38, and in the pilot supply pipe 25 a variable area orifice 39 whereof the area is selected by adjustment of the control member 40. The arrangement is the same as just above described in that the difference in the pressures in the supply pipe 25 on each side of the variable area orifice 39 is employed to effect a control on the supply of fuel to the main fuel injectors. A by-pass 42 controlled by a relief valve 43 is provided as in the other constructions.

In the arrangement shown in Figure 9, the main fuel pump 140 is a positive-displacement pump and is illustrated as a variable-stroke multi-plunger pump. The pump comprises a pump rotor 141 which is driven from the engine through the take-off drive 16 and comprises a series of cylinder bores 142 accommodating pump plungers 143. On rotation of the pump rotor 141, the plungers 143 are constrained to reciprocate against the action of springs 144 by means of a swash plate device 145. The angle of inclination of the swash plate 145 to the axis of rotation of the pump rotor 141 is adjustable to vary the stroke of the pump plungers and thus the quantity of fuel delivered into the supply pipe 24, by a mechanism to be described below under control of the pressure difference on each side of the variable area orifice 39.

The mechanism controlling the angle of inclination of the swash plate 145 comprises a piston 146 linked to the swash plate 145 and working in a cylinder 147 against the action of a spring 148. The spring-loaded side of the piston 146 is connected with the pump delivery port 149 through a duct 150 and a fixed restrictor 151, and the other side of the pison 146 is connected directly with the pump delivery port 149 through the duct 150. A bleed port 152 is provided from the spring-loaded side of the piston and it will be seen that when no bleed flow occurs through the port 152 the fluid pressures on each side of the piston 146 will be the same and the spring 148 will urge the piston 146 to the left, moving the swash plate 145 to the maximum delivery position. If, however, a bleed occurs through the port 152 a fluid pressure difference will occur across the piston 146 and the piston will be moved to the right reducing the pump stroke and thus the fuel delivery to the engine through the main supply pipe 24.

The bleed port 152 is connected by a pipe 153 to a mechanism 154 comprising a half ball valve element 155 controlling the bleed from pipe 153. The valve element 155 is carried on a lever 156 which is supported by a flexible diaphragm 157. The diaphragm 157 divides the mechanism 154 into two chambers 158 and 159, whereof the chamber 158 into which the bleed fluid from pipeline 153 passes, is connected by a pipeline 160 to the suction side of the main fuel pump 140.

The lever 156 is also loaded by a spring 162 in a direction tending to close the half ball valve 155 and by a push rod element 163 tending to open the half ball valve 155.

The push rod element 163 is carried by a piston 164 working in a cylinder divided into two chambers 165 and 166 respectively connected with the branch pipes 45 and 44 from the pilot fuel supply pipe 25 on either side of the variable area orifice 39. Thus the piston 164 is loaded in accordance with the pressure difference across the orifice 39 and an opening load is applied to the lever 156 by the push rod which is dependent upon the pressure difference across the orifice 39 and thus upon the engine rotational speed.

The operation of this mechanism is as follows:

When the half ball valve 155 is closed no bleed occurs through the bleed port 152 and the delivery of fuel to the main fuel supply pipe 24 is a maximum for the particular instantaneous running speed of the engine. If, however, the half ball valve 155 is open a bleed occurs through the bleed port 152 and the fuel delivery decreases.

Assuming the area of the orifice 39 to have been adjusted to select a desired engine speed, then an unwanted increase in speed will cause an increase in the pressure difference across the orifice 39 and an increase in the load applied to the lever 156 by the push rod 163 thus opening the bleed valve 155 causing a reduction in the fuel supply to the main fuel supply pipe 24. An unwanted decrease in speed causes the valve 155 to be closed more firmly, preventing bleed through the bleed port 152 and increasing the stroke of the variable-stroke pump and thus the delivery to the engine.

On adjusting the area of the orifice to select a larger effective area or a smaller effective area (corresponding to an increase or decrease in the selected speed respectively) the load applied to the lever 156 by the push rod 163 will decrease and increase respectively, thus increasing and decreasing respectively the stroke of the pump plungers 143 and thus correspondingly varying the delivery of fuel to the main fuel injectors through supply pipe 24.

In each of the fuel system arrangements above described, the relief valve 43 and the by-pass 42 merely act to ensure that the pressure of the fuel being delivered through the pilot supply pipe 25 to the pilot burners remains substantially constant and is unaffected by variations in the effective area of the variable area orifice 39.

The fine mesh filter 37 is provided in each case to keep the relatively small flow to the pilot injectors free from dirt and to avoid choking of the variable area orifice 39 and orifice 100.

We claim:

1. In a fuel system for gas-turbine engines and the like of the class comprising a main fuel injector, a main fuel supply line to said main fuel injector, a main pump in said main fuel supply line to deliver fuel to the main fuel injector, a main fuel movable control member positioned to control delivery of fuel through said main fuel supply line to said main fuel injector, a pilot fuel injector, and a pilot fuel supply line to said pilot fuel injector, the combination with said pilot fuel line of an auxiliary pump of the fixed-capacity positive-displacement type in said pilot fuel line to deliver fuel to said pilot fuel injector and connected to be driven at a speed proportional to the engine rotational speed, flow-restricting means in said pilot fuel line for passing the full flow from said auxiliary pump to said pilot fuel injector, pressure-responsive means including a pressure-responsive member connected to move said movable control member to control the delivery of fuel through said main fuel line to said main fuel injector, and connections from opposite sides of said pressure-responsive member to said pilot fuel line at opposite sides of said flow restricting means.

2. In a fuel system for gas-turbine engines and the like of the class comprising main fuel injectors, a main fuel supply line to said main fuel injectors, pilot fuel injectors, and a pilot fuel line to said pilot fuel injectors, the combination of a main fuel pump in said main fuel line for delivering fuel to the main injectors, a fixed-capacity positive-displacement pump connected to be driven at a speed proportional to the engine rotational speed and disposed in said pilot fuel line to deliver fuel to said pilot fuel injectors, said pilot fuel line being connected to receive the full delivery of said fixed-capacity positive-displacement pump, flow-restricting means of variable effective area in said pilot fuel line, a control member movable to select the effective area of said flow-restricting means, a pressure-responsive device including a pressure-responsive member, connections from opposite sides of said pressure-responsive member to said pilot fuel line at opposite sides of said flow-restricting means, and means actuated by said pressure-responsive member to control the fuel delivery from said main fuel pump to said main fuel injectors.

3. In a fuel system for gas-turbine engines and the like of the class comprising main fuel injectors, a main fuel line to said main injectors, pilot fuel injectors, and a pilot fuel line to said pilot injectors, the combination of a main variable-capacity non-positive displacement fuel pressurising pump connected to said main fuel line to deliver fuel to said main injectors, a movable control member in said main fuel line to control the actual fuel delivery from said pump to said main injectors, said main fuel line being the only fuel line to said main injectors whereby said pumped and controlled fuel passes wholly to said main fuel injectors, a fixed-capacity positive-displacement pump connected to be driven at a speed proportional to the engine rotational speed and connected to said pilot fuel line to deliver fuel to said pilot fuel injectors, said pilot fuel line connected to receive the full delivery of said fixed-capacity positive-displacement pump, flow-restricting means in said pilot fuel line, a pressure-responsive device including a pressure-responsive member, connections from opposite sides of said pressure-responsive member to said pilot fuel line at opposite sides of said flow-restricting means, and means actuated by said pressure-responsive member and connected to control said movable member.

4. In a fuel system for gas-turbine engines and the like of the class comprising main fuel injectors, a main fuel line to said main injectors, pilot fuel injectors, and a pilot fuel line to said pilot injectors, the combination of a main variable-capacity fuel pressurising pump connected to said main fuel line to deliver fuel to said main injectors, a movable control member in said main fuel line to control the actual fuel delivery from said main fuel pump, said main fuel line being the only fuel line to said main injectors whereby the pumped and controlled fuel passes wholly to said main fuel injectors, a fixed-capacity positive-displacement pump connected to be driven at a speed proportional to the engine rotational speed and connected to said pilot fuel line to deliver fuel to said pilot fuel injectors, said pilot fuel line being connected to receive the full delivery of said fixed-capacity positive - displacement pump, flow - restricting means of variable effective area in said pilot fuel line, means for adjusting said flow-restricting means to select the effective area of said flow-restricting means, a pressure-responsive device including a pressure-responsive member, connections from opposite sides of said pressure-responsive member to said pilot fuel line at opposite sides of said flow-restricting means, and means actuated by said pressure-responsive member to control first said movable member.

5. In a fuel system for gas-turbine engines and the like of the class comprising main fuel injectors, a main fuel line to said main injectors, pilot fuel injectors, and a pilot fuel line to said pilot injectors, the combination of a centrifugal fuel pump connected to said main fuel line to deliver fuel to said main injectors, a movable control member to control the actual fuel delivery from said centrifugal pump to said main injectors, said main fuel line being the only supply line of fuel to said main injectors whereby the pumped and controlled fuel passes wholly through said main fuel line to said main fuel injectors, a fixed-capacity positive-displacement pump connected to be driven at a speed proportional to the engine rotational speed and connected to deliver fuel through said pilot fuel line to said pilot fuel injectors, said pilot fuel line being connected to receive the full delivery of said fixed - capacity positive-displacement pump, flow-restricting means in said pilot fuel line, a pressure-responsive member, connections from opposite sides of said pressure-responsive member to said pilot fuel line at opposite sides of said flow-restricting means, and means actuated by said pressure-responsive member and connected to control said movable member.

6. In a fuel system for gas-turbine engines and the like of the class comprising main fuel injectors, a main fuel line to said main injectors, pilot fuel injectors, and a pilot fuel line to said pilot injectors, the combination of a centrifugal fuel pump connected to said main fuel line to deliver fuel to said main injectors, a movable control member in said main fuel line to control the actual fuel delivery from said centrifugal pump, said main fuel line being the only fuel line to said main injectors whereby the pumped and controlled fuel passes wholly to said main fuel injectors, a fixed-capacity positive-displacement pump connected to be driven at a speed proportional to the engine rotational speed and connected to said pilot fuel line to deliver fuel to said pilot fuel injectors, said pilot fuel line connected to receive the full delivery of said fixed-capacity positive-displacement pump, flow-restricting means of variable effective area in said pilot fuel line, means for adjusting said flow-restricting means to select the effective area of said flow-restricting means, a pressure-responsive member, connections from opposite sides of said pressure-responsive member to said pilot fuel line at opposite sides of said flow-restricting means, and means actuated by said pressure-responsive member to control first said movable member.

7. In a fuel system for gas-turbine engines and the like of the class comprising main fuel injectors, a main fuel line to said main injectors, pilot fuel injectors, and a pilot fuel line to said pilot injectors, the combination of a main variable-capacity positive-displacement pump connected to said main fuel line to deliver fuel to the main fuel injectors, a movable control member positioned to control the delivery of fuel from said main variable delivery positive-displacement pump through said main fuel supply line to said main fuel injectors, a fixed-capacity positive-displacement pump connected to be driven at a speed proportional to engine rotational speed and connected to said pilot fuel line to deliver fuel to said pilot fuel injectors, said pilot fuel line being connected to receive the full delivery of said fixed-capacity positive-displacement pump, flow-restricting means in said pilot fuel line, a pressure-responsive member, connections from opposite sides of said pressure-responsive member to said pilot fuel line at opposite sides of said flow-restricting means, and means actuated by said pressure-responsive member connected to control said movable member.

8. In a fuel system for gas-turbine engines and the like of the class comprising main fuel injectors, a main fuel line to said main injectors, pilot fuel injectors, and a pilot fuel line to said pilot injectors, the combination of a main variable-capacity positive-displacement pump connected to the main fuel line to deliver fuel to the main fuel injectors, a movable control member positioned to control the delivery of fuel from said main variable-delivery positive-displacement pump through said main fuel line to said main fuel injectors, a fixed-capacity positive-displacement pump connected to be driven at a speed proportional to engine rotational speed and connected to said pilot fuel line to deliver fuel to said pilot fuel injectors, said pilot fuel line being connected to receive the full delivery of said fixed-capacity positive-displacement pump, flow-restricting means of variable effective area in said pilot fuel line, means for adjusting said flow-restricting means to select the effective area of said flow-restricting means, a pressure responsive device including a pressure-responsive member having connections from opposite sides of said pressure-responsive member to said pilot fuel line at opposite sides of said flow-restricting means, and means actuated by said pressure-responsive member and connected to control first said movable member.

9. In a fuel system for gas-turbine engines and the like of the class comprising main fuel injectors, a main fuel line to said main injectors, pilot fuel injectors, and a pilot fuel line to said pilot injectors, the combination of a main variable-stroke plunger pump connected to said main fuel line to deliver fuel to the main injectors, a movable control member positioned to adjust the stroke of the pump plungers to vary the fuel delivery in said main fuel line to said main fuel injectors, a fixed-capacity positive-displacement pump connected to be driven at a speed proportional to engine rotational speed and connected to said pilot fuel line to deliver fuel to said pilot fuel injectors, said pilot fuel line being connected to receive the full delivery of said fixed-capacity positive-displacement pump, flow-restricting means in said pilot fuel line, a pressure responsive device including a pressure-responsive member, connections from opposite sides of said pressure-responsive member to said pilot fuel line at opposite sides of said flow-restricting means, and means actuated by said pressure responsive member and connected to control said movable member.

10. In a fuel system for gas-turbine engines and the like of the class comprising main fuel injectors, a main fuel line to said main injectors, pilot fuel injectors, and a pilot fuel line to said pilot injectors, the combination of a main variable-stroke plunger pump positioned to deliver fuel through said main fuel line to said main fuel injectors, a movable control member positioned to adjust the stroke of the pump plungers to vary the fuel delivery to said main fuel injectors, a fixed-capacity positive-displacement pump connected to be driven at a speed proportional to engine rotational speed and connected to said pilot fuel line to deliver fuel to said pilot fuel injectors, said pilot fuel line being connected to receive the full delivery of said fixed-capacity positive-displacement pump, flow-restricting means of variable effective area in said pilot fuel line, means connected to said flow-restricting means for moving the same to select the effective area of said flow-restricting means, a pressure-responsive device including a pressure-responsive member, connections from opposite sides of said pressure-responsive member to said pilot fuel line at opposite sides of said flow-restricting means, and means actuated by said-responsive member and connected to control said movable member for adjusting the stroke of the pump plunger.

11. In a fuel system for gas-turbine engines and the like of the class comprising main fuel injectors and pilot fuel injectors, the combination with said main and pilot fuel injectors, of a main fuel supply line to said main fuel injectors, a main fuel pump in said main fuel line, means positioned to control the fuel delivery from said main pump to said main fuel injectors, a pilot fuel line to said pilot fuel injectors, a fixed-capacity positive-displacement pump connected to be driven at a speed proportional to the engine rotational speed and connected to said pilot fuel line to deliver fuel to said pilot fuel injectors, said pilot fuel line being connected to receive the full delivery of said fixed-capacity positive-displacement pump, a first flow-restricting orifice in said pilot fuel line, an adjustable control member positioned to vary the effective area of said first orifice, a first pressure-responsive member, connections from opposite sides of said first pressure-responsive member to said pilot fuel line at opposite sides of said first flow-restricting orifice whereby said first pressure-responsive member is subjected to a first difference in the pressures in said pilot fuel line, means actuated by said first pressure-responsive member and connected to said means for controlling the fuel delivery from the main fuel pump through the main fuel line to the main fuel injectors whereby to adjust said last-named means, a second flow-restricting orifice in said pilot fuel line hydraulically in series with said first flow-restricting orifice, a second pressure-responsive member, connections from opposite sides of said second pressure-responsive member to opposite sides of said second flow-restricting orifice whereby said second pressure-responsive member is subjected to a second difference in the pressures in said pilot fuel line, and means actuated by said second pressure-responsive member connected to said means to control the fuel delivery from the main pump through said main fuel line to the main fuel injectors whereby to adjust said last-named means.

12. In a fuel system for gas-turbine engines and the like of the class comprising main fuel injectors and pilot fuel injectors, the combination with said main and pilot fuel injectors, of a main fuel supply line to said main fuel injectors, a main fuel pump in said main fuel line to deliver fuel to said main fuel injectors, a movable member positioned to adjust the fuel delivery from said main fuel pump through said main fuel line to said main fuel injectors, a pilot fuel line to said pilot fuel injectors, a fixed-capacity positive-displacement pump connected to be driven at a speed proportional to the engine rotational speed and connected to said pilot fuel line to deliver fuel to said pilot fuel injectors, flow-restricting means in said pilot fuel line, said pilot fuel line being connected to pass the full delivery of said fixed-capacity positive-displacement pump, a pressure-responsive member, connections from opposite sides of said pressure-responsive member to said pilot fuel line at opposite sides of said flow-restricting means whereby said pressure-responsive member is responsive to the difference in pressures on each side of said flow-restricting means, means actuated by said pressure responsive member and connected to said movable member to adjust said movable member to control the fuel delivery from the main fuel pump through said main fuel line to the main fuel injectors, resilient means positioned to apply a load to said pressure-responsive member, and an adjustable control member connected to modify the resilient load afforded by said resilient means on said pressure-responsive member and thereby to modify the response to said pressure-responsive member to the difference in pressures on each side of said flow-restricting means.

DAVID HAVELOCK BALLANTYNE.
ALBERT JUBB.

References Cited in the file of this patent

UNITED STATES PATENTS

| Number | Name | Date |
|---|---|---|
| 2,401,883 | Pugh | June 11, 1946 |
| 2,405,888 | Holley | Aug. 13, 1946 |
| 2,407,115 | Udale | Sept. 3, 1946 |
| 2,407,973 | Beckstrom | Sept. 24, 1946 |
| 2,424,035 | Ifield | July 15, 1947 |
| 2,479,813 | Chamberlin et al. | Aug. 13, 1949 |
| 2,498,939 | Bobier | Feb. 28, 1950 |

FOREIGN PATENTS

| Number | Country | Date |
|---|---|---|
| 920,910 | France | Jan. 8, 1947 |